US008386859B2

(12) United States Patent
Kursun et al.

(10) Patent No.: US 8,386,859 B2
(45) Date of Patent: Feb. 26, 2013

(54) ON-CHIP NON-VOLATILE STORAGE OF A TEST-TIME PROFILE FOR EFFICIENCY AND PERFORMANCE CONTROL

(75) Inventors: Eren Kursun, Ossining, NY (US);
Philip G. Emma, Danbury, CT (US);
Stephen M. Gates, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 347 days.

(21) Appl. No.: 12/771,387

(22) Filed: Apr. 30, 2010

(65) Prior Publication Data
US 2011/0271161 A1 Nov. 3, 2011

(51) Int. Cl.
| G11C 29/00 | (2006.01) |
| G11C 7/00 | (2006.01) |
| G01R 31/28 | (2006.01) |
| G01R 27/28 | (2006.01) |
| G01R 31/00 | (2006.01) |
| G01R 31/14 | (2006.01) |
| G06F 11/00 | (2006.01) |

(52) U.S. Cl. ........ 714/718; 714/719; 714/720; 714/722; 714/723; 714/736; 365/201; 702/117; 702/118
(58) Field of Classification Search ........................ None
See application file for complete search history.

(56) References Cited

U.S. PATENT DOCUMENTS

| 6,163,856 | A | 12/2000 | Dion et al. |
| 6,181,975 | B1 * | 1/2001 | Gross et al. ..................... 700/29 |
| 6,353,834 | B1 | 3/2002 | Wong et al. |
| 6,523,130 | B1 | 2/2003 | Hickman et al. |
| 6,845,306 | B2 * | 1/2005 | Henry et al. .................. 701/29.6 |
| 6,862,689 | B2 | 3/2005 | Bergsten et al. |
| 6,915,447 | B2 | 7/2005 | Kleiman |
| 6,941,450 | B2 | 9/2005 | Atherton et al. |
| 7,164,264 | B2 | 1/2007 | Anderson et al. |
| 7,205,854 | B2 | 4/2007 | Liu |

(Continued)

FOREIGN PATENT DOCUMENTS

| EP | 1062581 B1 | 3/1999 |
| EP | 1571798 B1 | 8/2008 |

(Continued)

OTHER PUBLICATIONS

Interview Summary dated Mar. 20, 2012 for U.S. Appl. No. 12/771,293; 3 pages.

(Continued)

*Primary Examiner* — Guerrier Merant
(74) *Attorney, Agent, or Firm* — Stephen J. Walder, Jr.; William Stock

(57) ABSTRACT

Mechanisms for controlling an operation of one or more cores on an integrated circuit chip are provided. The mechanisms retrieve, from an on-chip non-volatile memory of the integrated circuit chip, baseline chip characteristics data representing operational characteristics of the one or more cores prior to the integrated circuit chip being operational in the data processing system. Current operational characteristics data of the one or more cores are compared with the baseline chip characteristics data. Deviations of the current operational characteristics data from the baseline chip characteristics data are determined and used to determine modifications to an operation of the one or more cores. Control signals are sent to one or more on-chip management units based on the determined modifications to cause the operation of the one or more cores to be modified.

20 Claims, 6 Drawing Sheets

U.S. PATENT DOCUMENTS

| | | |
|---|---|---|
| 7,386,851 B1 | 6/2008 | Zyuban et al. |
| 7,532,078 B2 * | 5/2009 | Agarwal et al. .................. 331/57 |
| 7,535,035 B2 | 5/2009 | Baek et al. |
| 7,576,569 B2 | 8/2009 | Carpenter et al. |
| 7,596,726 B2 | 9/2009 | Pomaranski et al. |
| 2002/0007470 A1 | 1/2002 | Kleiman |
| 2002/0152429 A1 | 10/2002 | Bergsten et al. |
| 2003/0126133 A1 | 7/2003 | Dattatri et al. |
| 2005/0043908 A1 * | 2/2005 | Bhavnagarwala et al. ..... 702/64 |
| 2005/0091369 A1 | 4/2005 | Jones |
| 2006/0080062 A1 | 4/2006 | Bose et al. |
| 2006/0277435 A1 | 12/2006 | Pedersen et al. |
| 2007/0168692 A1 | 7/2007 | Quintiliano |
| 2008/0059840 A1 | 3/2008 | Takezawa et al. |
| 2008/0172539 A1 * | 7/2008 | Boss et al. .................... 711/165 |
| 2008/0294296 A1 * | 11/2008 | Liu et al. ....................... 700/300 |
| 2009/0006883 A1 | 1/2009 | Zhang et al. |
| 2009/0106714 A1 * | 4/2009 | Culp et al. ......................... 716/5 |
| 2009/0189703 A1 | 7/2009 | Chuang et al. |
| 2010/0332909 A1 | 12/2010 | Larson |
| 2011/0126056 A1 * | 5/2011 | Kelleher et al. ................. 714/42 |

FOREIGN PATENT DOCUMENTS

| | | |
|---|---|---|
| JP | 2004094608 A2 | 3/2004 |
| WO | WO 02/077810 A1 | 10/2002 |

OTHER PUBLICATIONS

Office Action mailed Dec. 21, 2011 for U.S. Appl. No. 12/771,293; 11 pages.

Response to Office Action filed with the USPTO on Mar. 16, 2012 for U.S. Appl. No. 12/771,293; 17 pages.

U.S. Appl. No. 12/771,293.

Muller, Gerhard et al., "Status and Outlook of Emerging Nonvolatile Memory Technologies", Infineon Technol. AG, Munich, Germany, Electron Devices Meeting, 2004, IEDM Technical Digest, IEEE International, Dec. 13-15, 2004, pp. 23.1.1-23.1.4.

Coskun, Ayse K. et al., "Proactive Temperature Balancing for Low Cost Thermal Management in MPSoCs", IEEE/ACM Int. Conf. on Comp.-Aided Des., 2008, pp. 250-257.

Eaton, Ian, "The Ins and Outs of System Logging Using Syslog", SANS Institute, 2003, 53 pages.

Zhong, Zheng-Yu et al, "An On-Chip Monitor for Measuring NBTI Degradation of Digital Circuits", 16th IEEE IPFA, Jul. 6-10, 2009, pp. 468-471.

Notice of Allowance mailed May 23, 2012 for U.S. Appl. No. 12/771,293; 5 pages.

* cited by examiner

ON-CHIP NON-VOLATILE STORAGE OF A TEST-TIME PROFILE FOR EFFICIENCY AND PERFORMANCE CONTROL

BACKGROUND

The present application relates generally to an improved data processing apparatus and method and more specifically to an on-chip non-volatile storage of a test-time profile for use in efficiency and performance control of the chip resources.

Microprocessor chip reliability and efficiency are of primary importance in current processor design. Increasingly, sophisticated on-chip resource management units, controllers, and storage units are dedicated to improve the chip efficiency and reliability at runtime. Most of these on-chip controllers and dedicated resource management units start with the basic assumption that the underlying chip hardware is ideal, or so close to ideal that it can be safely assumed to be ideal. However, there are a number of research studies that indicate that this assumption is far from reality.

Most chips exhibit significant variation in the form of performance variation, power consumption, and temperature variation, as well as differences in operating corners and the like. Since the on-chip resource management units are oblivious to such variations, they are not fully capable of improving efficiency and reliability of the on-chip resources. That is, the on-chip resource management units assume that all of the computational cores, processors, and/or functional units operate identically across the chip.

For example, if a chip has inherent heating tendencies in a set of computational cores, e.g., due to increased leakage power, process variation (differences in the operation of a core due to variations in the manufacturing or forming of the core), or the like, such inherent heating tendencies are not taken into account by the on-chip resource management units. To the contrary, because the on-chip resource management units are oblivious to such inherent tendencies, the heating causes undesirable hot-spots to be generated on the chip.

There are various tests that are utilized at the manufacturer site to profile the on-chip resources including corner tests for multi-core architectures, functional tests, etc. The information gathered during such tests is not stored to improve the efficiency of the chip during regular operation, however. To the contrary, these tests are typically used to determine whether a chip passes or fails in order to determine whether the chip needs to be discarded or not. Moreover, this information is not stored for improved efficiency because there are major complications with the flow of this information. For example, chip manufacturers may be unwilling to provide such information since it may indicate weaknesses of the chip. Moreover, there has been no real appreciation of the potential use of such information during operation of the chip. Furthermore, even if the information flow were more free, the on-chip resource management units do not having the ability to maintain such information when the chip is powered down.

SUMMARY

In one illustrative embodiment, a method, in a data processing system, is provided for controlling an operation of one or more cores on an integrated circuit chip. The method comprises retrieving, from an on-chip non-volatile memory of the integrated circuit chip, baseline chip characteristics data representing operational characteristics of the one or more cores prior to the integrated circuit chip being operational in the data processing system. The method further comprises comparing current operational characteristics data of the one or more cores on the integrated circuit chip with the baseline chip characteristics data. Moreover, the method comprises determining deviations of the current operational characteristics data of the one or more cores on the integrated circuit chip from the baseline chip characteristics data. Furthermore, the method comprises determining modifications to an operation of the one or more cores based on the determined deviations. In addition, the method comprises sending control signals to one or more on-chip management units to cause the operation of the one or more cores to be modified in accordance with the determined modifications.

In another illustrative embodiment, an integrated circuit chip is provided. The integrate circuit chip comprises one or more cores, an on-chip characterization device coupled to the one or more processing cores, an on-chip non-volatile memory coupled to the on-chip characterization device, and one or more on-chip management units coupled to the one or more cores and the on-chip characterization device. The on-chip characterization device comprises logic configured to retrieve, from the on-chip non-volatile memory, baseline chip characteristics data representing operational characteristics of the one or more cores prior to the integrated circuit chip being operational in a data processing system. The logic is further configured to compare current operational characteristics data of the one or more cores on the integrated circuit chip with the baseline chip characteristics data. The logic is also configured to determine deviations of the current operational characteristics data of the one or more cores on the integrated circuit chip from the baseline chip characteristics data. Moreover, the logic is configured to determine modifications to an operation of the one or more cores based on the determined deviations. Furthermore, the logic is configured to send control signals to one or more on-chip management units to cause the operation of the one or more cores to be modified in accordance with the determined modifications.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms by which baseline chip characterization map information gathered at manufacturer test time may be stored in an on-chip non-volatile storage device and utilized during operation of the chip to take into account the inherent variations in the chip at the time the chip was manufactured. Moreover, mechanisms are provided for updating this chip characterization map information dynamically during operation of the chip based on information gathered from on-chip sensors, hardware counters, and the like, to generate one or more time-varying updated chip characterization map information data structures. In this way, differences between the updated chip characterization map information and the baseline chip characterization map information, or even between updated chip characterization map information gathered at different times during the operation of the chip, may be used as an indication of the aging of the chip, i.e. performance degradation in the operation of the chip due to use of the chip. The baseline chip characterization map information, updated chip characterization map information, and any differences between this information may be used to update on-chip management units so as to adjust the operation of the chip to improve performance and energy efficiency.

The illustrative embodiments may be utilized in many different types of data processing environments and computing devices. For example, the mechanisms of the illustrative embodiments may be implemented in conjunction with a single processor computing system, multiple processor computing system, symmetric multiprocessor (SMP) system, heterogeneous multiprocessor system, or the like. The various types and configurations of computing devices in which mechanisms of the illustrative embodiments may be implemented cannot be succinctly described herein due to the sheer number of these types and configurations. However, FIG. 1 is provided hereafter as an example of one generic configuration in which the mechanisms of the illustrative embodiments may be implemented.

Figure 1:
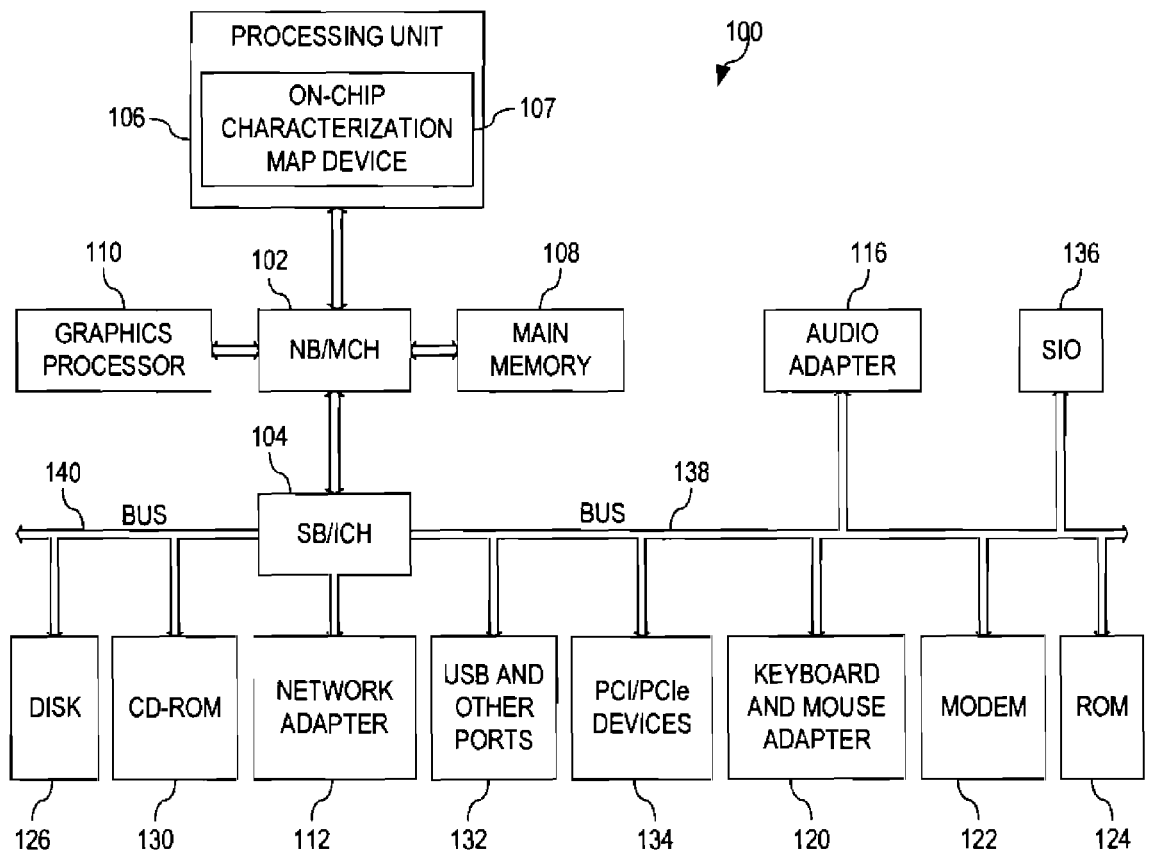
FIG. 1 is an example block diagram of a type of data processing system in which aspects of the illustrative embodiments may be implemented.

FIG. 1 is an example block diagram of a data processing system in which aspects of the illustrative embodiments may be implemented. A "data processing system" as the term is used herein means any device configured to process data and may encompass many different types of device/system architectures, device/system configurations, and combinations of device/system architectures and configurations. Typically, a data processing system will include at least one processor and at least one memory provided in hardware, such as on an integrated circuit chip. However, a data processing system may include many processors, memories, and other hardware and/or software elements provided in the same or different computing devices. Furthermore, a data processing system may include communication connections between computing devices, network infrastructure devices, and the like.

Data processing system 100 is an example of a single processor unit based system, with the single processor unit comprising one or more on-chip computational cores, or processors. In this example, the processing unit 106 may constitute a single chip with the other elements being provided by other integrated circuit devices that may be part of a motherboard, multi-layer ceramic package, or the like, to collectively provide a data processing system, computing device or the like. The chip comprising the processing unit 106 may further include an on-chip characterization map device 107 in accordance with the illustrative embodiments of the present invention as set forth herein.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 204. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, such as a SMP, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

As mentioned above, the mechanisms of the illustrative embodiments operate to take information gathered during manufacturer testing of a chip for purposes of making pass/fail determinations and either discarding or keeping a chip, and utilizing that information to generate baseline chip characterization map information. In this way, the baseline chip characterization map information serves as a type of "birth certificate" of the chip indicating the baseline operational characteristics of the functional elements of the chip. This baseline chip characteristic information is stored in an on-chip non-volatile storage device, e.g., an on-chip non-volatile memory (NVM), and utilized during operation of the chip to take into account the inherent variations in the chip at the time the chip was manufactured.

Various memory array devices may be used to store the baseline chip characterization map information, including but not limited to fuses, such as eFuses available from International Business Machines Corporation, floating gate programmable memories (PROMs), magneto-resistive memories, oxide based resistive memories, anti-fuses, or another type of NVM storage device. The NVM storage device and access circuits are preferably fabricated on the microprocessor chip, either in the Back End of Line (BEOL) wiring levels (i.e. wiring levels used to interconnect components, such as transistors, resistors, or the like, on the wafer), or on the silicon substrate. Within the scope of the present invention, alternate embodiments may use a separate memory chip (fabricated with non-volatile technology, such as flash, magnetic random access memory, or another technology) in a multichip module (MCM) connected to the microprocessor chip for performing the storage functions.

In one example, the NVM device is fabricated as a resistive random access memory (RRAM) in which resistive elements are comprised of a phase change material (PCM), thereby providing a phase change memory. In a second example, the NVM device may be fabricated as an oxide resistive memory (OxRAM) array. As is generally known in the art, there are many potential NVM technologies available, any of which may be used within the spirit and scope of the present invention. Bit density, power consumption, retention time, cost, and other considerations may all be used to select the technology used.

Figure 2A:
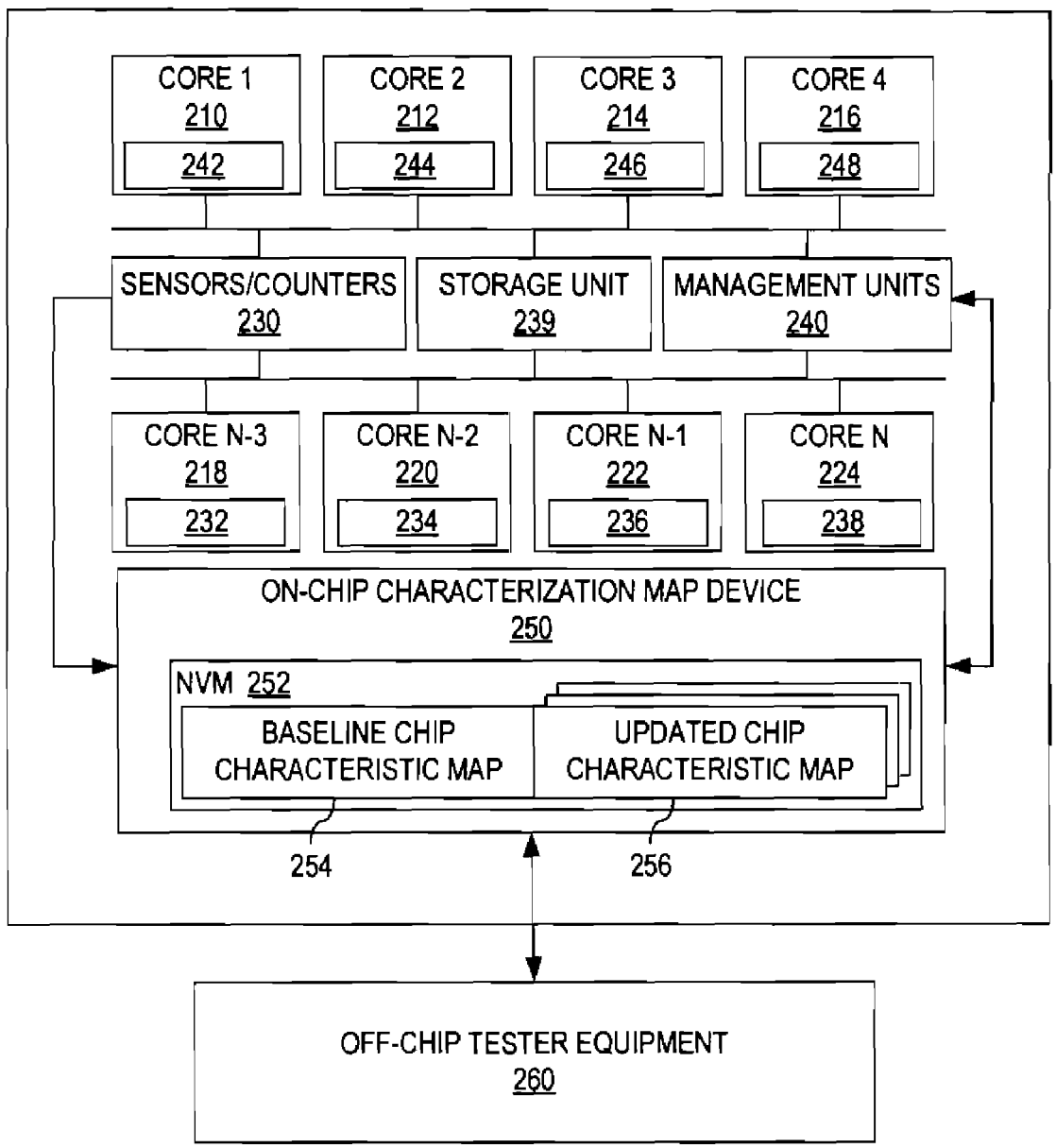
FIG. 2A is an example block diagram of a multi-core processor chip having an on-chip characterization device in accordance with one illustrative embodiment.

The illustrative embodiments further provide mechanisms for updating this chip characterization map information dynamically during operation of the chip based on information gathered from on-chip sensors, hardware counters, and the like, to generate one or more time-varying updated chip characterization map information data structures. In this way, differences between the updated chip characterization map information and the baseline chip characterization map information, or even between updated chip characterization map information gathered at different times during the operation of the chip, may be used as an indication of the aging of the chip, i.e. performance degradation in the operation of the chip due to use of the chip. The baseline chip characterization map information, updated chip characterization map information, and any differences between this information may be used to update on-chip management units so as to adjust the operation of the chip to improve performance and energy efficiency FIG. 2A is an example block diagram of a multi-core processor chip having an on-chip characterization map device in accordance with one illustrative embodiment. As shown in FIG. 2A, the multi-core processor chip 200 includes a plurality of computational cores, or processors, 210-224 (hereafter referred to as the cores), on-chip sensors/hardware counters 230, storage structures 232-239, 242-248 (both within and outside of the core for which the illustrative embodiments are also applicable), one or more on-chip management units 240, and an on-chip characterization map device 250. While a multi-core processor chip 200 is shown in FIG. 2A as an example embodiment, it should be appreciated that the present invention is not limited to multi-core processor chips. Rather, the mechanisms of the present invention may likewise be applied to single core chips as well. Furthermore, while FIG. 2 shows at least 8 cores being provided on the chip 200, this is not necessary and in the multi-core processor chip 200 embodiments, any number of cores constituting a plurality of cores, i.e. 2 or more cores, may be used without departing from the spirit and scope of the illustrative embodiments.

Taking a multi-core processor chip 200 as an example implementation, it should be appreciated that when the chip 200 is fabricated by the manufacturer, the various cores 210-224, individual functional units within the cores 210-224, storage structures 232-239, or the like, i.e. on-chip hardware devices provided on the chip, may have variations due to many different factors including a possible measure of error involved in the process used to fabricate the chip 200. These variations may cause differences in the operational characteristics of the cores 210-224, the individual functional units within the cores 210-224, or the like. For example, if the same workload were run on each of the cores 210-224, a difference in the performance of at least a subset of the cores 210-224 may be detected due to differences in the operational characteristics of the cores 210-224, e.g., voltage range, frequency range, power consumption, temperature, and the like.

In some cases these variations may cause some of the cores to be not operable for the purposes intended, i.e. operational characteristics of some of the cores may be outside acceptable ranges. The external off-chip tester equipment 260 may be used by the manufacturer to test the chip to determine whether the cores 210-224, or at least a required number of the cores 210-224, meet predetermined requirements with regard to operational characteristics. For example, the off-chip tester equipment 260 may perform various wafer and module level tests, such as functional tests to test the functional units of the cores 210-224, corner tests, burn-in tests, on-chip sensor calibration processes, and the like. Such manufacturing tests and calibrations are generally known in the art and thus, a more detailed explanation is not provided herein.

During such tests, the off-chip tester equipment 260 generally outputs a large amount of information regarding the various operational characteristics of the functional units and cores 210-224. As mentioned previously, this information is used for purposes of determining whether the chip 200 as a whole passes or fails requirements for indicating that the chip 200 is useable and should not be discarded. Moreover, such information may be used to rate the chip 200 as usable for particular purposes. If the chip 200 passes these requirements, the chip 200 is kept and sorted according to its rating, a process referred to as "binning" the chip 200. If the chip 200 does not pass one or more of the tests, the chip 200 may be discarded as unusable. Once this determination is made as to whether the chip 200 is usable or not, the information gathered during the manufacturing testing is typically discarded and is not maintained for purposes of controlling the performance of the chip 200 during normal operations.

With the mechanisms of the illustrative embodiments, however, this information is provided by the external off-chip tester equipment 260 to the on-chip characterization map device 250. Either the external off-chip tester equipment 260 or the on-chip characterization map device 250 analyzes and filters this manufacturer test information to extract a baseline chip characteristic map 254, i.e. a set of data representing the baseline operational characteristics of the chip 200 when it was manufactured, for storage in a first portion of an on-chip non-volatile memory 252 of the on-chip characterization map device 250. By storing this baseline chip characteristic map 254 in the on-chip non-volatile memory 252, the portion of the manufacturer test information that is used to generate the baseline on-chip characteristic map 254 is kept with the chip 200 to which it pertains and is maintained even when the chip 200 is not powered so that it is accessible from the on-chip non-volatile memory 252 for use by on-chip management units 240 when the chip is powered on and from external off-chip devices when the chip 200 is either powered on or powered off through an interface with the on-chip characterization map device 250.

Figure 2B:
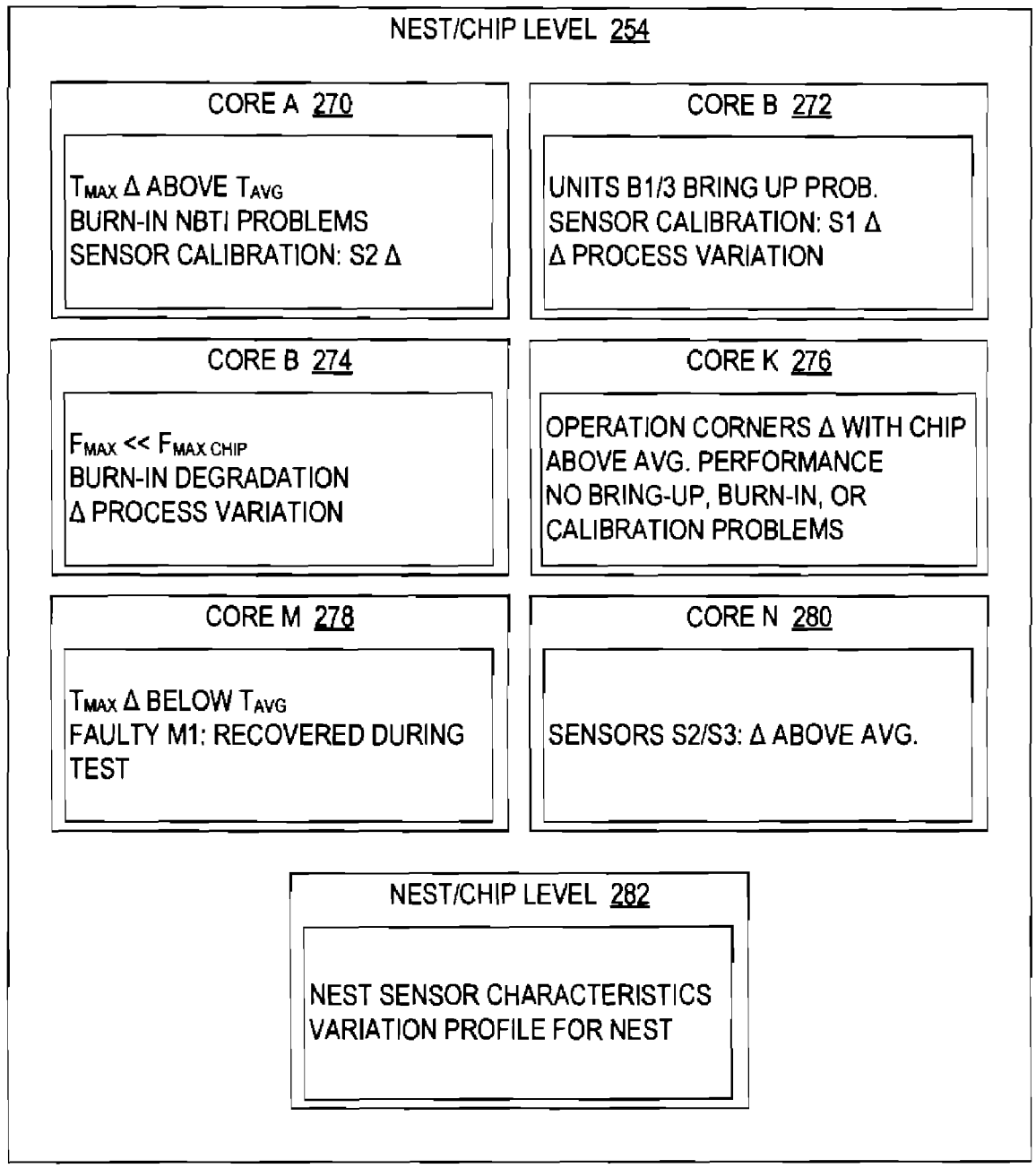
FIG. 2B is an example diagram illustrating an example of a baseline chip characteristic map in accordance with one illustrative embodiment.

FIG. 2B is an example diagram illustrating an example of a baseline chip characteristic map 254 in accordance with one illustrative embodiment. As shown in FIG. 2B, the baseline chip characteristic map 254 may include portions 270-280 for storing important characteristic information, on a core, processor, functional unit, storage structure, or the like, basis, and portion 282 for storing chip level characteristic information, as determined during manufacturer testing of the chip. The types and amounts of such important information that are stored in the on-chip non-volatile memory may differ depending upon the type of chip, the various characteristics deemed important to performance of the chip as identified by designers, or the like. The information generated and output during manufacturer testing is sorted and filtered in accordance with such criteria specifying important performance information and the results are summarized and stored in the various potions 270-280 of the baseline chip characteristic map 254. For example, thresholds may be established for various characteristics of importance at manufacturer time and any information gathered by manufacturer tests that indicate that these thresholds are exceeded may be used as a basis for establishing the baseline chip characteristic map 254.

For example, in FIG. 2B, at manufacturing time it was determined that core A had a maximum temperature that was a certain delta above the average temperature of all of the cores on the chip, burn-in tests indicated that there were some NBTI issues, and the sensor calibration indicated that there was an appreciable difference between the operation of sensor 52 and other sensors on the chip. Similarly, for core C, it was determined that the maximum operating frequency for core C was much less than the maximum operating frequency for the chip, there was detected burn-in degradation, and a process variation in the forming of core C relative to the other cores was determined. Moreover, positive characteristics may be determined, such as with core K where the performance of core C was determined to be above the average performance of the cores and no problems were identified during bring-up, burn-in, or calibration testing. Furthermore, characteristics for the chip as a whole as well as the other portions of the chip outside of the cores, i.e. the "nest", may be identified, sorted/filtered, and stored in a portion 282 of the baseline chip characteristics map 254. All of these types of information may be identified during manufacturer testing and sorting/filtering of the information generated through manufacturer testing so that this information may be summarized and stored in the various portions 270-282 of the baseline chip characteristics map 254.

Referring again to FIG. 2A, the portion of the on-chip non-volatile memory 252 that stores the baseline chip characteristics map 254 may be non-modifiable, i.e. not re-writable. For example, this portion of the on-chip non-volatile memory 252 may be provided as a bank of fuses where data is burned-into the fuses by either blowing the fuses or leaving the fuses as unblown (representing either a digital "0" or "1" depending upon whether the fuse is blown or not). In this way, the baseline chip characteristics map data 254 may be permanently stored in the on-chip non-volatile memory 252. Of course other types of modifiable and non-modifiable non-volatile memory, such as read only memory (ROM), an electrically erasable programmable read only memory (EEPROM), floating gate PROMs, a random access memory (RAM). or the like, may be used without departing from the spirit and scope of the illustrative embodiments.

The on-chip characterization map unit 250 may make use of the baseline chip characterization map 254, along with information gathered from on-chip sensors/hardware counters 230, when determining how to make adjustments to the operation of the cores 210-224 of the chip 200, e.g., modifying a frequency of operation, enabling or disabling the core, modifying voltage supply operations, and the like. The information from the on-chip sensors/hardware counters 230 provides information for generating an updated chip characteristic map 256 identifying the current operational state of the on-chip resources, e.g., functional units, cores 210-224, or the like. Because of the inherent density of non-volatile memory, profile information can be stored on a per functional unit, block, or other level of fine granularity.

The updated chip characteristic map 256 may be stored in a second portion of the non-volatile memory 252. This second portion may be modifiable, i.e. re-writable, and may store one or more of these updated chip characteristic maps 256. If multiple updated chip characteristic maps 256 are maintained in the second portion, these multiple updated chip characteristic maps 256 may constitute a history of the aging of the chip 200 over time. This information may be important to maintain for purposes of understanding how various resources of the chip change over time both for purposes of modifying the operation of these resources but also for further improvements in the design/fabrication of these resources in future chips. In one illustrative embodiment, the first portion and second portion of the non-volatile memory 252 may be embodied in a multi-layer matrix NVM storage that stores both the baseline chip characteristic information and also the time varying aspects of the chip characteristic information as well as spatial characteristics.

By comparing the updated chip characteristic map 256 with the baseline chip characteristic map 254, the on-chip characterization map unit 250 is able to determine a change in the operation of the chip 200 over time and may determine adjustments to the operation of the functional units, cores 210-224, or the like, so as to cause the chip 200 to continue to operate within acceptable ranges of operation. The on-chip management units 240 may comprise a plurality of management units 240 associated with one or more of the cores 210-224 and/or individual functional units of the cores 210-224. These on-chip management units 240 provide control signals to the functional units of the cores 210-224 to modify their operation. The on-chip characterization map unit 250 may send control signals to the on-chip management units 240 to instruct the on-chip management units 240 to perform the adjustments to control the operation of the various functional units, cores 210-224, or the like.

Thus, the illustrative embodiments provide mechanisms for storing the baseline chip characteristic map generated from information gathered by the manufacturer's testing of the chip. This information is then maintained with the chip after the chip is placed into a data processing system or other computing device and is made operational. The baseline chip characteristic map may then be used during operation of the chip to make adjustments to the operation of the chip. In this way, by making the underlying characteristics and imperfections of the chip resources available to the on-chip characterization map unit, and ultimately to the on-chip management units via the control signals provided by the on-chip characterization map unit, chip efficiency is improved by taking into account the baseline operation of the chip and compensating for it when determining how to modify the operation of the chip's resources. Without such information, the on-chip management units assume that the chip is perfect with all cores running perfectly at every operational corner (e.g., clock frequency, supply voltage corners), leaking equally with no variation, operate at the same speed, etc. The baseline chip characteristic map allows the on-chip characterization map device and the management units to make realistic assumptions about the operating corners of the chip, differences in leakage, operating speed, and the like, of the functional units, cores, etc., and improve the efficiency as a result.

It should be noted that while the illustrative embodiments are described with regard to identifying negative characteristics of the functional units, cores, etc., such as whether a core is prone to excessive heating, has static power dissipation, etc., the mechanisms of the illustrative embodiments may also be used to identify positive characteristics, such as, for example, core A can operate at significantly high supply voltage and at higher clock rates providing much higher performance than other cores on the chip. The positive characteristics can be leveraged for higher performance for the entire chip (e.g., by running single-thread performance demanding applications on core A). Similar cases can also exist for low power (energy efficient) cores (e.g., Core B) that performs at the same performance with the rest of the chip. In such a case, these cores can be leveraged for high-power high-temperature applications that are likely to cause power increases (and temperature increases) on other cores, but for coreB-like cores this impact will be minimal. Other situations in which positive characteristics are identified and taken into account when determining how to modify the operation of the functional units, cores, etc., on the chip are intended to be within the spirit and scope of the present invention.

As one example, assume that through the manufacturer testing it is determined that core 1 of the chip varies from the other cores on the chip by having an operating temperature characteristic that is X degrees higher than the average operating temperatures of the cores. This information is stored in the baseline chip characteristic map and may be later used during operation when the on-chip sensors determined the operating temperature of the cores and the chip. Assuming that during operation the temperature of the chip exceeds an acceptable range for the chip, the on-chip characterization map device may instruct the management units to modify the operation of the cores to reduce the temperature. For example, workloads may be assigned to different cores based on the operational temperature of the cores such that workloads that stress the cores more may be sent to lower operational temperature cores. In making such determinations, it may be determined that while cores 2-8 have an operational temperature that is Y above or below the average operational temperature, core 1 will have an operational temperature that is Y+X above the average operational temperature and thus, will need to have additional compensation applied. In another example if the inherent static power dissipation of one of the cores (e.g., core 2) is determined to be lower than the rest of the cores, a high-power task can be assigned to this core. As a result, the power efficiency of the chip will be improved because of this assignment.

The on-chip characterization map data structure may be, for example, a baseline chip characteristic map data structure or an updated chip characteristic map data structure that may be stored in the on-chip non-volatile memory. As noted above, after manufacturer wafer and module level testing are performed, the information gathered by the testing is analyzed and filtered to generate the baseline chip characteristic map data structure which is then stored in a first portion of the on-chip non-volatile memory. A copy of this baseline chip characteristic map may be created in the second portion of the on-chip non-volatile memory for use in generated updated chip characteristic map data structures by updating information within the copy of the characteristic map using acquired sensor/counter information during operation of the chip. In some embodiments, multiple updated chip characteristic map data structures may be generated in order to provide an aging history for the chip. In such a case, when an updated chip characteristic map data structure is created by updating the data structure using gathered sensor/counter information, a copy of that data structure may be generated in the second portion of the on-chip non-volatile memory for use in generating the next updated chip characteristic map data structure. This copy may be performed at the end of a current update operation or at the beginning of the next update operation.

The on-chip characteristic map data structure stores various data representing the operational characteristics of the functional units, cores, or the like, at a particular point in time. For example, the baseline chip characteristic map data structure stores the operational characteristic information for the chip at a time 0, i.e. at manufacturing time before normal operation of the chip in a data processing system or computing device. The updated chip characteristic map data structures store the updated operational characteristic information for the chip at a later time t when the chip is already operational in a data processing system or computing device. The later time t may be a single time period at a predetermined point in time of the lifespan of the chip, at predetermined time intervals, etc. It should be appreciated that the updated operational characteristic information may be generated by only updating a sub-portion of the operational characteristic information in the baseline or previously updated chip characteristic map. That is, a portion of the updated chip characteristic map may be identical to the baseline or previously updated chip characteristic map.

In one example embodiment, the chip characteristic map data structure comprises a table data structure having entries for each of the cores 1 through N that are present on the chip. In each entry, various fields may be provided for storing operational characteristics of the particular corresponding core. These fields are populated at the end of the manufacturer test-time assessment when these various operational characteristics are determined for each core, processing unit, functional unit, storage unit and/or the like.

These operational characteristics may include, for example, the ideal voltage and frequency at which the core, processing unit, functional unit, storage unit, etc. operates best (most cores operate over a range of voltages/frequencies but not as effectively). These operational characteristics may further include the full operational range that the core, processing unit, etc., would be operational (supply voltages, clock frequency rates, etc.), ring-oscillator or other variation sensor data (indicating how much process variation exists in the particular core), critical path monitors (CPM) indicating how the delay characteristics of the core differ from other cores, a leakage profile such as a static power dissipation profile of the core with respect to the other cores on the chip, and the like.

An aging field may be provided in the entries of the chip characteristic map data structure. The aging field may store an indicator of whether or not the on-chip characterization map device has determined that the particular core is suffering from aging. This determination may be made based on pre-determined criteria, thresholds for differences between operational characteristics from the baseline operational characteristics, and the like, as may be stored in configuration registers of the on-chip characterization map device, and whether a delay sensor, e.g., a negative bias temperature instability (NBTI) sensor or other type of delay sensor, provided on the chip, outputs a measured value is greater than a threshold. NBTI is a key reliability issue with integrated circuit chips, such as the processor chips in which the illustrative embodiments are implemented, and is typically manifest as an increase in the threshold voltage and decrease in the drain current and trans-conductance of the chip. NBTI is an indicator of aging of integrated circuit chip devices. Such NBTI sensors are generally known in the art.

With some illustrative embodiments, if the on-chip characterization map determines that one or more operational characteristic thresholds have been exceeded and the NBTI sensor threshold has been exceeded by the measured value output by the NBTI sensor, then the particular core is experiencing degraded performance due to aging of the core. As a result, the on-chip characterization map device may set a value in the aging field for the corresponding core to indicate that the core is degraded due to aging.

Once the core is assessed and it is determined that the core is aging, various changes to the operation of the core can be made to compensate for the aging. For example, modifications can be made to adjust the core's operational state (such as supply voltages, clock frequency, etc.) or workload assignments such that the core is not stressed as much. As another example. less computationally intensive tasks can be given to the core that is suffering from aging. Moreover, an independent wear-out technique may be used to deal with the aging issue.

Figure 3:
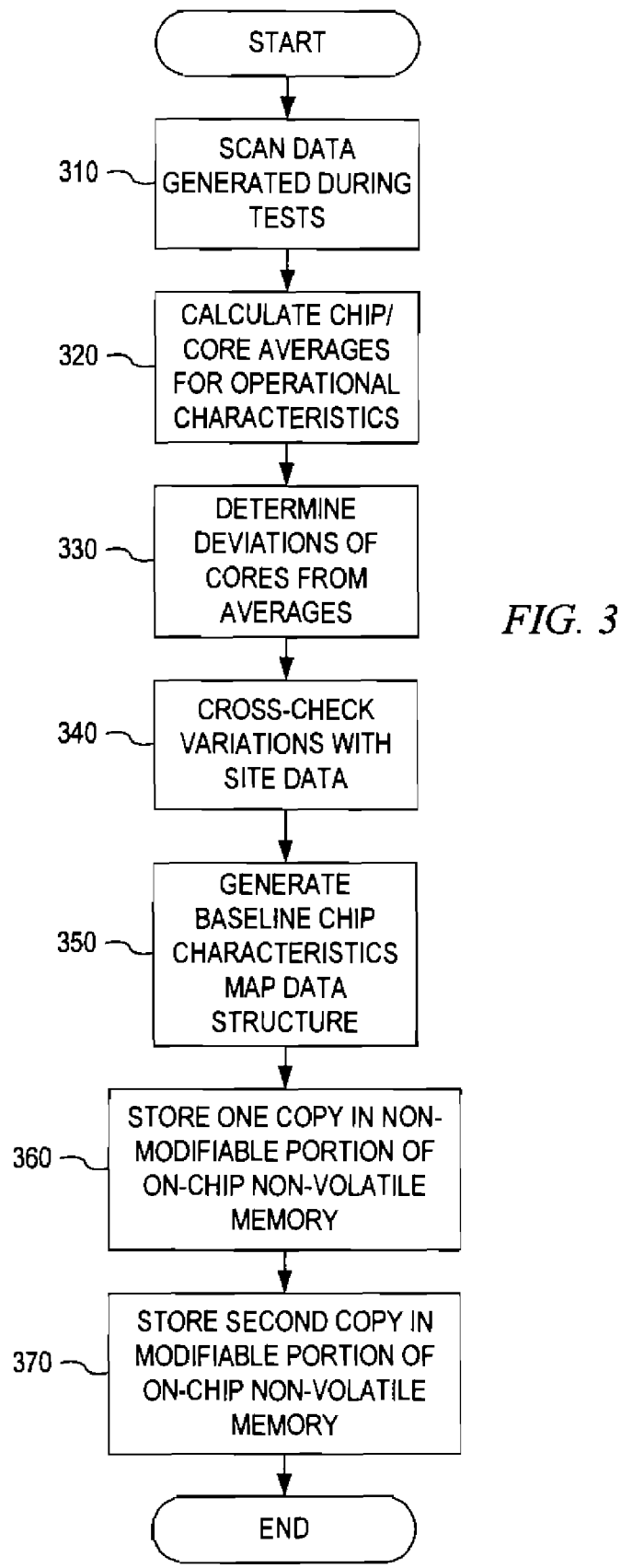
FIG. 3 is a flowchart outlining an example operation for generating chip characterization information for storage in the on-chip characterization map device.

FIG. 3 is a flowchart outlining an example operation for generating chip characterization information for storage in the on-chip characterization map device. The operation outlined in FIG. 3 may be performed, for example, by the on-chip characterization map device after manufacturer testing of the chip but prior to installation of the chip into a data processing device or computing device so that the chip becomes operational. Alternatively, the operations in FIG. 3 may be performed by an off-chip tester device with the results of the operation being stored (see steps 360 and 370 hereafter) in an on-chip non-volatile memory associated with the on-chip characterization map device.

As shown in FIG. 3, the operation starts by scanning the data generated during the manufacturer testing (step 310). This data may be stored in storage devices associated with an external off-chip tester unit. Typically, this information is discarded by the off-chip tester unit after a determination that the chip either passes or fails operational requirements for the chip. However, with the illustrative embodiments, this information is scanned to generate a baseline chip characteristics map.

From the scan of the data from the manufacturer tests, chip and/or core averages for operational characteristics are calculated (step 320). A determination is made as to the deviations of the operational characteristics of the chip/core from the chip/core averages (step 330). These deviations are cross-checked with site data (step 340). That is, checks are performed both among the processing units, cores, functional units, etc., on the same chip, among chips from the same wafer, and among wafers from the same manufacturer site. Sometimes the deviations and abnormalities identified are caused by the manufacturing site. Thus, the cross-checking with the site data checks the processing unit, core, functional unit, etc. operational characteristics against normal/average data from the manufacturer site as well.

A baseline chip characteristics map is then generated based on these deviations (step 350). A first copy of the baseline chip characteristics map is stored in the non-modifiable portion of the on-chip non-volatile memory (step 360). This serves as the "birth certificate" of the chip by identifying the operational characteristics of the chip at an initial time after manufacturer testing and prior to operation of the chip in a data processing system and computing device. A second copy of the baseline chip characteristics map is stored in a modifiable portion of the on-chip non-volatile memory for use in generating updated chip characteristic map(s) (step 370). The operation then terminates.

Figure 4:
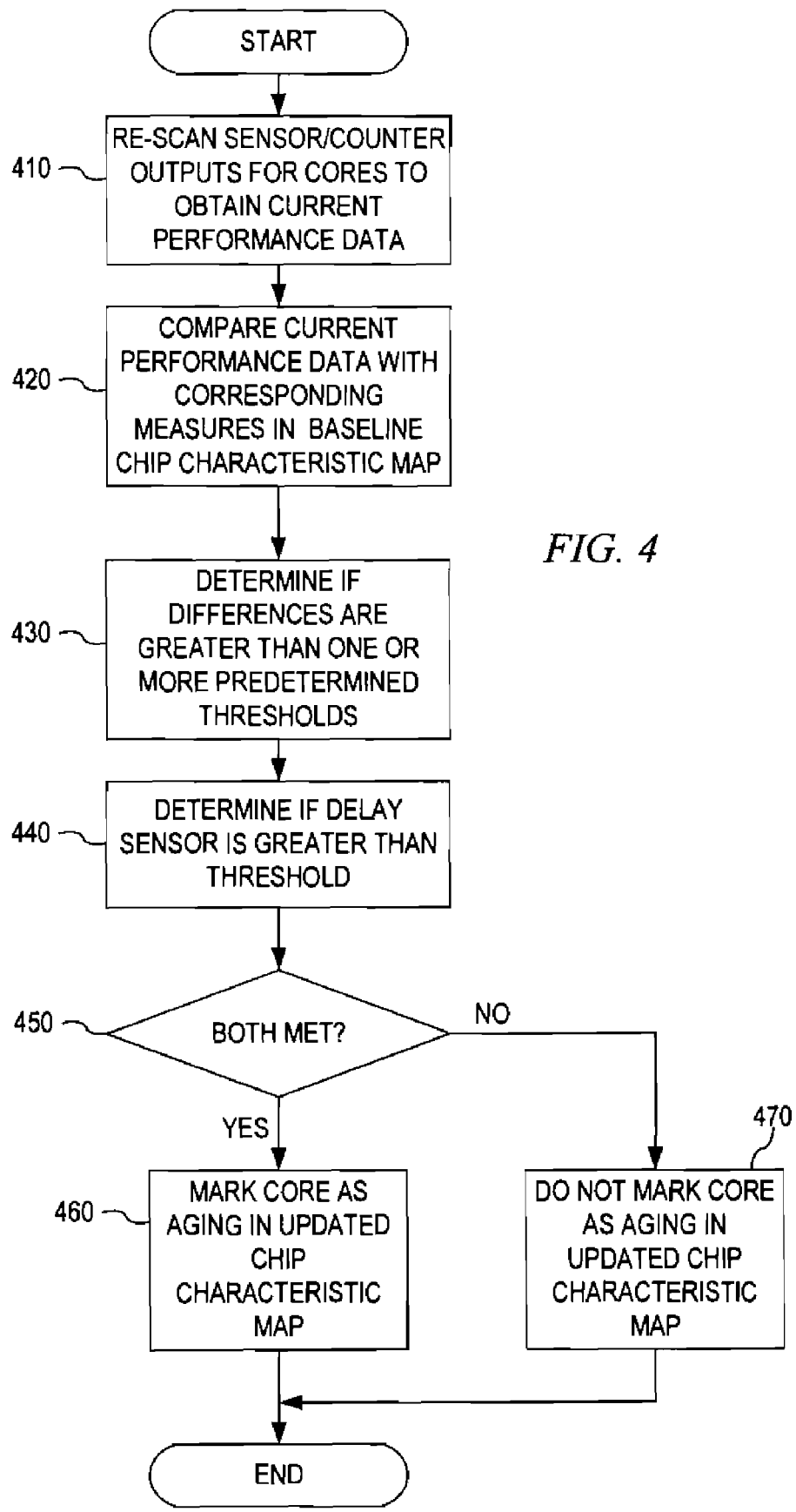
FIG. 4 is a flowchart outlining an operation for generating run-time aging updates to the chip characterization information stored in the on-chip characterization map device in accordance with one illustrative embodiment.

FIG. 4 is a flowchart outlining an operation for generating run-time aging updates to the chip characterization information stored in the on-chip characterization map device in accordance with one illustrative embodiment. The operation outlined in FIG. 4 may be performed, for example, by the on-chip characterization map device at one or more predetermined time periods after the chip becomes operational in a data processing system or computing device.

As shown in FIG. 4, the operation starts with a rescan of the sensor/counter outputs for the cores to obtain the current performance data for the cores (step 410). The current performance data is compared with the corresponding measures in the baseline chip characteristic map stored in the on-chip non-volatile memory associated with the on-chip characterization map device (step 420). A determination is made as to whether any differences between the current performance data and the corresponding measures in the baseline chip characteristic map are greater than one or more predetermined thresholds for those measures of operational characteristics (step 430). A determination is made as to whether a delay sensor associated with the chip and/or the core generates an output that is greater than an associated threshold (step 440).

Based on these determinations, an ultimate determination is made as to whether both criteria are met, i.e. the differences are greater than one or more predetermined thresholds and the delay sensor threshold is exceeded (step 450). If both criteria are met, then the corresponding core is marked as aging in the updated chip characteristic map in the modifiable portion of the on-chip non-volatile memory (step 460). Otherwise, the core is not marked as aging (step 470). The operation then terminates.

Figure 5:
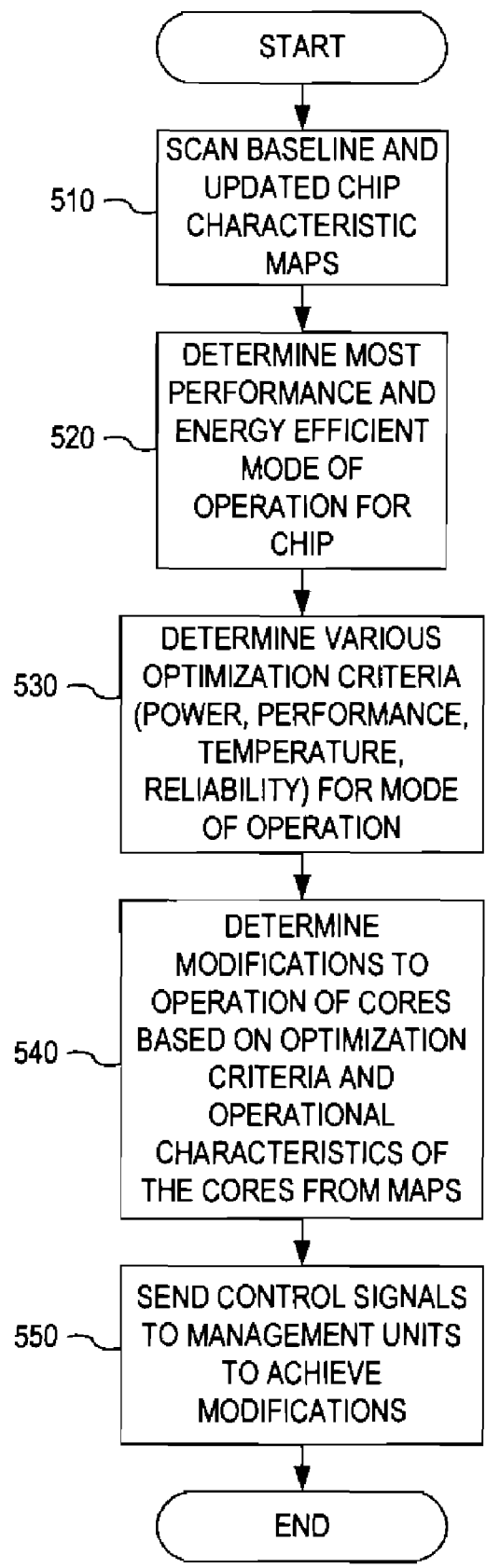
FIG. 5 is a flowchart outlining an operation for performing dynamic performance and energy efficiency adjustments based on the chip characterization information in the on-chip characterization map device.

FIG. 5 is a flowchart outlining an operation for performing dynamic performance and energy efficiency adjustments based on the chip characterization information in the on-chip characterization map device. This operation may again be performed by the on-chip characterization map device in conjunction with on-chip management units that control the operation of the cores and other chip resources so as to achieve a desired operation within an acceptable operational range. Alternatively, this operation may be performed, at least partially, on an external data processing device, for example, that takes the baseline chip characteristic map information and updated chip characteristic map information from the chip and performs the other operations to determine how to adjust the operation of the chip, if at all. The operation may be performed such that chip level optimization may be achieved so as to maximize performance, minimize temperature, minimize power consumption, and the like. Alternatively, the operation may be performed to optimize the operation of individual devices on the chip.

As shown in FIG. 5, the operation starts by scanning the baseline and updated chip characteristic map data structures in the on-chip non-volatile memory (step 510). By using this information (stored in the on-chip non-volatile memory), on-chip resources are managed more efficiently in terms of performance, power or temperature (step 520). For example, if a core is determined to inherently provide high performance, the management of the chip may assign a task to that core that needs this higher performance. As another example, if a core is determined to be inherently operating at a high temperature, the management of the chip can reduce that core's supply voltage or clock frequency to minimize the heating of that core, or assign less stressing tasks that allow the core the operate at a cooler temperature.

Based on the selected performance and energy mode of operation, various corresponding optimization criteria are determined for the operational characteristics of the chip/cores (step 530). These criteria may be power, performance, temperature, and/or reliability criteria for achieving the goals of the selected performance and energy mode of operation. Based on these criteria and the operational characteristics of the cores and/or chip as a whole, determinations are made as to the modifications that need to be made to the operation of the cores and/or chip (step 540). Based on these determined modifications, control signals are sent to the management units of the chip to achieve the modifications (step 550). The operation then terminates.

Thus, the illustrative embodiments provide mechanisms for storing manufacturer testing information regarding the operational characteristic information for a chip prior to deployment of the chip in a data processing system or computing device, on the chip in a non-volatile memory device. This information may then be used by an on-chip characterization map device and on-chip management units to manage the operation of the cores and the chip as a whole. Therefore, the illustrative embodiments improve upon known mechanisms by maintaining the baseline operational characteristic information of the cores/chip in association with the chip via an on-chip non-volatile memory such that it can be used and compensated for when determining appropriate modifications to the operation of the cores and the chip.

As will be appreciated by one skilled in the art, aspects of the present invention may be embodied as a system, method, or computer program product. For example, much of the present invention may be implemented in hardware devices on an integrated circuit chip while other aspects are implemented as software executing on one or more processing devices. As an example, many of the operations for generating the manufacturer test data may be implemented using software executing on a processor. Similarly, various analysis, if performed by an off-chip device, may be performed using software, or a combination of software and hardware.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon. For example, the operations described above with regard to the off-chip tester/recovery assist unit may be implemented in a computer program product having instructions that are executed by one or more data processing devices. Moreover, other aspects of the on-chip reliability controller, the FSM, or the like, may be implemented in software, or a combination of software and hardware, where the software aspects are executed on one or more processing devices, rather than the functionality of these elements being entirely embodied within hardware.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to the illustrative embodiments of the invention. It will be understood that, unless otherwise indicated, each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code in accordance with aspects of the illustrative embodiments will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for controlling an operation of one or more on-chip hardware devices on an integrated circuit chip, comprising:

retrieving, from an on-chip non-volatile memory of the integrated circuit chip, baseline chip characteristics data representing operational characteristics of the one or more on-chip hardware devices prior to the integrated circuit chip being operational in the data processing system;

comparing current operational characteristics data of the one or more on-chip hardware devices on the integrated circuit chip with the baseline chip characteristics data;

determining deviations of the current operational characteristics data of the one or more on-chip hardware devices on the integrated circuit chip from the baseline chip characteristics data;

determining modifications to an operation of the one or more on-chip hardware devices based on the determined deviations; and sending control signals to one or more on-chip management units to cause the operation of the one or more on-chip hardware devices to be modified in accordance with the determined modifications.

2. The method of claim 1, wherein the baseline chip characterization data is generated from manufacturer test data collected by an off-chip tester device after fabrication of the integrated circuit chip but prior to the chip being operational in the data processing system.

3. The method of claim 1, further comprising:

updating the baseline chip characteristics map data during operation of the integrated circuit chip in the data processing system, based on the current operational characteristics data, to generate an updated chip characteristics data structure; and storing the updated chip characteristics data structure in the on-chip non-volatile memory.

4. The method of claim 1, wherein the current operational characteristics data is gathered from outputs from at least one of on-chip sensors or on-chip hardware counters that measure a performance of the one or more on-chip hardware devices on the integrated circuit chip.

5. The method of claim 1, wherein determining deviations of the current operational characteristics data from the baseline chip characteristics data comprises determining if an on-chip hardware device, in the one or more on-chip hardware devices, on the integrated circuit chip is suffering from performance degradation of the operation of the on-chip hardware device, and wherein determining modifications to an operation of the one or more on-chip hardware devices based on the determined deviations comprises modifying the operation to reduce a stress applied to the on-chip hardware device if it is determined that the on-chip hardware device is suffering from performance degradation of the operation of the on-chip hardware device.

6. The method of claim 1, wherein the modifications to the operation of the one or more on-chip hardware devices comprises at least one of modifying an operating frequency of the one or more on-chip hardware devices, disabling a on-chip hardware device in the one or more on-chip hardware devices, modifying a voltage supply of the one or more on-chip hardware devices, or adjusting a workload executed on the one or more on-chip hardware devices.

7. The method of claim 1, wherein the method is implemented by on-chip logic of the integrated circuit chip provided in an on-chip characterization device of the integrated circuit chip.

8. The method of claim 7, wherein the baseline chip characteristics data is generated from an off-chip tester device performing at least one of wafer or module level tests on the integrated circuit chip, and wherein the off-chip tester device provides the baseline chip characteristic data to the on-chip characterization device.

9. The method of claim 8, wherein the at least one of wafer or module level tests comprise at least one of functional tests of functional units in the one or more on-chip hardware devices, corner tests, burn-in tests, or on-chip sensor calibration processes.

10. The method of claim 1, wherein the baseline operational characteristics data comprises at least one of a voltage range, a frequency range, a power consumption, and a temperature.

11. The method of claim 3, wherein the on-chip non-volatile memory comprises a first portion for permanently storing the baseline chip characteristics data and a second portion for storing the updated chip characteristics data structure in a rewritable manner.

12. The method of claim 11, wherein the first portion comprises at least one bank of fuses, a floating gate programmable memory (PROM), a magneto-resistive memory, an oxide based resistive memory, a bank of anti-fuses, or a phase change memory.

13. An integrated circuit chip, comprising:
one or more on-chip hardware devices;
an on-chip characterization device coupled to the one or more on-chip hardware devices;
an on-chip non-volatile memory coupled to the on-chip characterization device; and
one or more on-chip management units coupled to the one or more on-chip hardware devices and the on-chip characterization device, wherein the on-chip characterization device comprises logic configured to:
retrieve, from the on-chip non-volatile memory, baseline chip characteristics data representing operational characteristics of the one or more on-chip hardware devices prior to the integrated circuit chip being operational in a data processing system;
compare current operational characteristics data of the one or more on-chip hardware devices on the integrated circuit chip with the baseline chip characteristics data;
determine deviations of the current operational characteristics data of the one or more on-chip hardware devices on the integrated circuit chip from the baseline chip characteristics data;
determine modifications to an operation of the one or more on-chip hardware devices based on the determined deviations; and
send control signals to one or more on-chip management units to cause the operation of the one or more on-chip hardware devices to be modified in accordance with the determined modifications.

14. The integrated circuit chip of claim 13, wherein the baseline chip characterization data is generated from manufacturer test data collected by an off-chip tester device after fabrication of the integrated circuit chip but prior to the chip being operational in a data processing system, and wherein the baseline chip characterization data is provided by the off-chip tester device to the on-chip characterization device.

15. The integrated circuit chip of claim 13, wherein the on-chip characterization device further comprises logic configured to:
update the baseline chip characteristics data during operation of the integrated circuit chip in the data processing system, based on the current operational characteristics data, to generate an updated chip characteristics data structure; and
store the updated chip characteristics data structure in the on-chip non-volatile memory.

16. The integrated circuit chip of claim 13, wherein the current operational characteristics data is gathered from outputs from at least one of on-chip sensors or on-chip hardware counters provided on the integrated circuit chip that measure a performance of the one or more on-chip hardware devices.

17. The integrated circuit chip of claim 13, wherein logic of the on-chip characterization device is further configured to determine deviations of the current operational characteristics data from the baseline chip characteristics data by determining if a on-chip hardware device, in the one or more on-chip hardware devices, on the integrated circuit chip is suffering from performance degradation of the operation of the on-chip hardware device, and determine modifications to an operation of the one or more on-chip hardware devices based on the determined deviations by modifying the operation to reduce a stress applied to the on-chip hardware device if it is determined that the on-chip hardware device is suffering from performance degradation of the operation of the on-chip hardware device.

18. The integrated circuit chip of claim 13, wherein the modifications to the operation of the one or more on-chip hardware devices comprises at least one of modifying an operating frequency of the one or more on-chip hardware devices, disabling a on-chip hardware device in the one or more on-chip hardware devices, modifying a voltage supply of the one or more on-chip hardware devices, or adjusting a workload executed on the one or more on-chip hardware devices.

19. The integrated circuit chip of claim 15, wherein the on-chip non-volatile memory comprises a first portion for permanently storing the baseline chip characteristics data and a second portion for storing the updated chip characteristics data structure in a rewritable manner.

20. The integrated circuit chip of claim 13, wherein the first portion comprises at least one bank of fuses, a floating gate programmable memory (PROM), a magneto-resistive memory, an oxide based resistive memory, a bank of anti-fuses, or a phase change memory.

* * * * *